(12) United States Patent
Smeets et al.

(10) Patent No.: US 11,770,373 B2
(45) Date of Patent: Sep. 26, 2023

(54) PROVISIONING OF VENDOR CREDENTIALS

(71) Applicant: Telefonaktiebolaget LM Ericsson (publ), Stockholm (SE)

(72) Inventors: Bernard Smeets, Dalby (SE); Lina Palsson, Genarp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 319 days.

(21) Appl. No.: 16/649,293

(22) PCT Filed: Sep. 25, 2017

(86) PCT No.: PCT/EP2017/074194
§ 371 (c)(1),
(2) Date: Mar. 20, 2020

(87) PCT Pub. No.: WO2019/057308
PCT Pub. Date: Mar. 28, 2019

(65) Prior Publication Data
US 2020/0296090 A1    Sep. 17, 2020

(51) Int. Cl.
*G06F 21/57* (2013.01)
*H04L 9/40* (2022.01)
(Continued)

(52) U.S. Cl.
CPC ...... *H04L 63/0823* (2013.01); *H04L 63/0236* (2013.01); *H04W 12/35* (2021.01); *H04W 12/37* (2021.01); *G06F 21/575* (2013.01)

(58) Field of Classification Search
CPC .............. H04L 63/0823; H04L 9/3268; H04L 63/0876; H04L 9/0825; H04L 9/3263;
(Continued)

(56) References Cited

U.S. PATENT DOCUMENTS

| | | | | |
|---|---|---|---|---|
| 8,392,721 | B2 * | 3/2013 | Kaleedhass | G07C 9/37 713/186 |
| 2005/0039016 | A1 * | 2/2005 | Aissi | H04L 63/0823 713/176 |

(Continued)

FOREIGN PATENT DOCUMENTS

| | | | | |
|---|---|---|---|---|
| CN | 107113315 B | * | 11/2020 | G07C 9/25 |
| EP | 3163490 A1 | | 5/2017 | |

(Continued)

OTHER PUBLICATIONS

"What Is the Difference Between HSM, TPM, Secure Enclave, and Secure Element or Hardware Root of Trust", Mar. 3, 2022, obtained online from <https://www.wolfssl.com/difference-hsm-tpm-secure-enclave-secure-element-hardware-root-trust/>, retrieved on Jan. 23, 2023 (Year: 2022).*

(Continued)

*Primary Examiner* — Farid Homayounmehr
*Assistant Examiner* — Zhimei Zhu
(74) *Attorney, Agent, or Firm* — Christopher & Weisberg, P.A.

(57) ABSTRACT

There is provided mechanisms for obtaining a VC certificate from a server. A method is performed by network equipment. The method comprises performing, by an enclave of the network equipment, measurements on at least one property of the network equipment. The method comprises providing, by the enclave, a request for the VC certificate from the server upon having attested the measurements. The method comprises receiving, from the server, the VC certificate in response to the request and storing the VC certificate in the network equipment.

30 Claims, 6 Drawing Sheets

(51) Int. Cl.
*H04W 12/37* (2021.01)
*H04W 12/30* (2021.01)

(58) Field of Classification Search
CPC ..... H04W 12/37; H04W 12/35; G06F 21/575; G06F 21/33; G06F 2221/2129; G06F 21/53; G06F 21/57
See application file for complete search history.

(56) References Cited

U.S. PATENT DOCUMENTS

| | | | |
|---|---|---|---|
| 2006/0253702 A1* | 11/2006 | Lowell | H04L 63/0823 713/172 |
| 2011/0023086 A1* | 1/2011 | Goldman | H04L 65/1016 726/3 |
| 2011/0091039 A1 | 4/2011 | Spitz et al. | |
| 2013/0031374 A1* | 1/2013 | Thom | G06F 21/74 713/189 |
| 2016/0134623 A1* | 5/2016 | Roth | H04L 63/0823 713/156 |
| 2017/0286668 A1* | 10/2017 | Shanahan | G06F 21/53 |
| 2018/0241572 A1* | 8/2018 | Miele | G06F 21/57 |
| 2018/0285560 A1* | 10/2018 | Negi | G06F 21/72 |
| 2019/0020647 A1* | 1/2019 | Sinha | G06F 21/33 |
| 2020/0310392 A1* | 10/2020 | Ermler | G05B 19/4185 |

FOREIGN PATENT DOCUMENTS

| | | | | |
|---|---|---|---|---|
| WO | WO-0221763 A1 * | 3/2002 | | G06F 21/32 |
| WO | WO-2015047442 A1 * | 4/2015 | | G06F 21/31 |

OTHER PUBLICATIONS

"Intel(R) Software Guard Extensions Developer Guide", 2016, obtained online from <chrome-extension://efaidnbmnn-nibpcajpcglclefindmkaj/https://download.01.org/intel-sgx/linux-1,6/docs/Intel_SGX_Developer_Guide.pdf>, retrieved on Jan. 25, 2023 (Year: 2016).*

PCT International Search Report, dated Apr. 5, 2018, in connection with International Application No. PCT/EP2017/074194, all pages.

PCT Written Opinion, dated Apr. 5, 2018, in connection with International Application No. PCT/EP2017/074194, all pages.

Victor Costan et al., "Intel SGX Explained", Computer Science and Artificial Intelligence Laboratory, Massachusetts Institute of Technology, date unknowm, 118 pages.

* cited by examiner

PROVISIONING OF VENDOR CREDENTIALS

TECHNICAL FIELD

Embodiments presented herein relate to a method, network equipment, a computer program, and a computer program product for obtaining a VC certificate from a server. Embodiments presented herein further relate to a method, a server, a computer program, and a computer program product for providing a VC certificate to network equipment.

BACKGROUND

Trustworthy operation of network equipment is of importance to realize an overall trustworthy communications network that user can utilize for all kinds of services. Security procedures are therefore followed when incorporating new network equipment in new or existing communications networks.

As an example, in communications networks within the third generation partnership project (3GPP) the procedure to securely incorporate new network equipment is based on the use of so-called vendor hardware credentials, here after referred to as vendor credentials (VCs). In general terms, VCs are cryptographic identities by which a piece of network equipment can prove, during the enrolment in the communications network, that it is a genuine product from a genuine manufacturer.

Equipment manufacturers have to deploy secure provisioning procedures during manufacturing of network equipment that assure that the installation of VCs is done in a manner such that the VC truly identifies the correct network equipment and that VC are not illegally passed to unauthorized manufacturers.

The VCs themselves are traditional public-key cryptography based keys and certificates and one uses a public key infrastructure (PKI) to securely maintain the collection of true VCs. Via the PKI one also maintains those VC that are revoked either because the provisioning into the hardware malfunctioned or the hardware has been reported as broken or has reached end-of-life.

A common procedure is that in the manufacturing site of the network equipment there is a VC programming station that is connected to the hardware of the network equipment and to a PKI service in order to obtain a VC certificate for a credential that resides on the network equipment or a VC certificate and credential pair. In order to prevent that VC credentials are obtained in a non-authorized manner for non-approved purposes, access to the PKI service is commonly only available to factory operators and equipment in the manufacturing site that are trustworthy. In the manufacturing site, the VC certificates are securely stored in the network equipment using hardware protection features which guarantee that, the VC private key is encrypted when stored in non-volatile memory such as flash memory, and that the VC certificate is stored so it cannot be tampered with without being detected by the network equipment.

FIG. 1 schematically illustrates a system 100a in which a traditional way of providing VC certificates to network equipment 200 is used. The network equipment comprises an application 240 in which there is provided an enclave 245. The network equipment has a hardware identity (HW ID). The VC certificate is provided from a server 300 by means of an operator 500 operating a programming station 400. Towards this end, the operator is given access credentials to the PKI service. Public keys (pubkey) 250, 410 are used for setting up secure communications between the network equipment and the programming station.

In this way of organizing, the setup and the operation of the secure environment in the manufacturing site incurs considerable production cost and operational practical problems, such as management of personnel that must be vetted before allowing to operate the programming station and getting access to the encryption keys that make the programming station to be able to connect to the PKI service.

Hence, there is still a need for an improved provision of VC certificates to network equipment.

SUMMARY

An object of embodiments herein is to provide efficient provisioning of VC certificates to network equipment.

According to a first aspect there is presented a method for obtaining a VC certificate from a server. The method is performed by network equipment. The method comprises performing, by an enclave of the network equipment, measurements on at least one property of the network equipment. The method comprises providing, by the enclave, a request for the VC certificate from the server upon having attested the measurements. The method comprises receiving, from the server, the VC certificate in response to the request and storing the VC certificate in the network equipment.

According to a second aspect there is presented network equipment for obtaining a VC certificate from a server. The network equipment comprises processing circuitry. The processing circuitry is configured to cause the network equipment to perform, by an enclave of the network equipment, measurements on at least one property of the network equipment. The processing circuitry is configured to cause the network equipment to provide, by the enclave, a request for the VC certificate from the server upon having attested the measurements. The processing circuitry is configured to cause the network equipment to receive, from the server, the VC certificate in response to the request and to store the VC certificate in the network equipment.

According to a third aspect there is presented network equipment for obtaining a VC certificate from a server. The network equipment comprises processing circuitry and a storage medium. The storage medium stores instructions that, when executed by the processing circuitry, cause the network equipment to perform operations, or steps. The operations, or steps, cause the network equipment to perform, by an enclave of the network equipment, measurements on at least one property of the network equipment. The operations, or steps, cause the network equipment to provide, by the enclave, a request for the VC certificate from the server upon having attested the measurements. The operations, or steps, cause the network equipment to receive, from the server, the VC certificate in response to the request and to store the VC certificate in the network equipment.

According to a fourth aspect there is presented network equipment for obtaining a VC certificate from a server. The network equipment comprises a measurement module configured to perform, by an enclave of the network equipment, measurements on at least one property of the network equipment. The network equipment comprises a provide module configured to provide, by the enclave, a request for the VC certificate from the server upon having attested the measurements. The network equipment comprises a receive module configured to receive, from the server, the VC certificate in response to the request and to store the VC certificate in the network equipment.

According to a fifth aspect there is presented a computer program for obtaining a VC certificate from a server. The computer program comprises computer program code which, when run on processing circuitry of network equipment, causes the network equipment 200 to perform a method according to the first aspect.

According to a sixth aspect there is presented a method for providing a VC certificate to network equipment. The method is performed by a server. The method comprises receiving a request for the VC certificate from an enclave of the network equipment. The method comprises providing the VC certificate to the enclave.

According to a seventh aspect there is presented a server for providing a VC certificate to network equipment. The server comprises processing circuitry. The processing circuitry is configured to cause the server to receive a request for the VC certificate from an enclave of the network equipment. The processing circuitry is configured to cause the server to provide the VC certificate to the enclave.

According to an eighth aspect there is presented a server for providing a VC certificate to network equipment. The server comprises processing circuitry and a storage medium. The storage medium stores instructions that, when executed by the processing circuitry, cause the server to perform operations, or steps. The operations, or steps, cause the server to receive a request for the VC certificate from an enclave of the network equipment. The operations, or steps, cause the server to provide the VC certificate to the enclave.

According to a ninth aspect there is presented a server for providing a VC certificate to network equipment. The server comprises a receive module configured to receive a request for the VC certificate from an enclave of the network equipment. The server comprises a provide module configured to provide the VC certificate to the enclave.

According to a tenth aspect there is presented a computer program for providing a VC certificate to network equipment, the computer program comprising computer program code which, when run on processing circuitry of a server, causes the server to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these network equipment, these servers, and these computer programs provide efficient provisioning of VC certificates to the network equipment.

Advantageously these methods, these network equipment, these servers, and these computer programs enable simplification of, or obsolete, the inspection procedures prior to manufacturing start of the network equipment and reduction of the operational costs and practical hurdles to maintain security of procedures.

Advantageously these methods, these network equipment, these servers, and these computer programs enable the security requirements on the programming station hardware at the manufacturing site to be reduced.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

Figure 1:
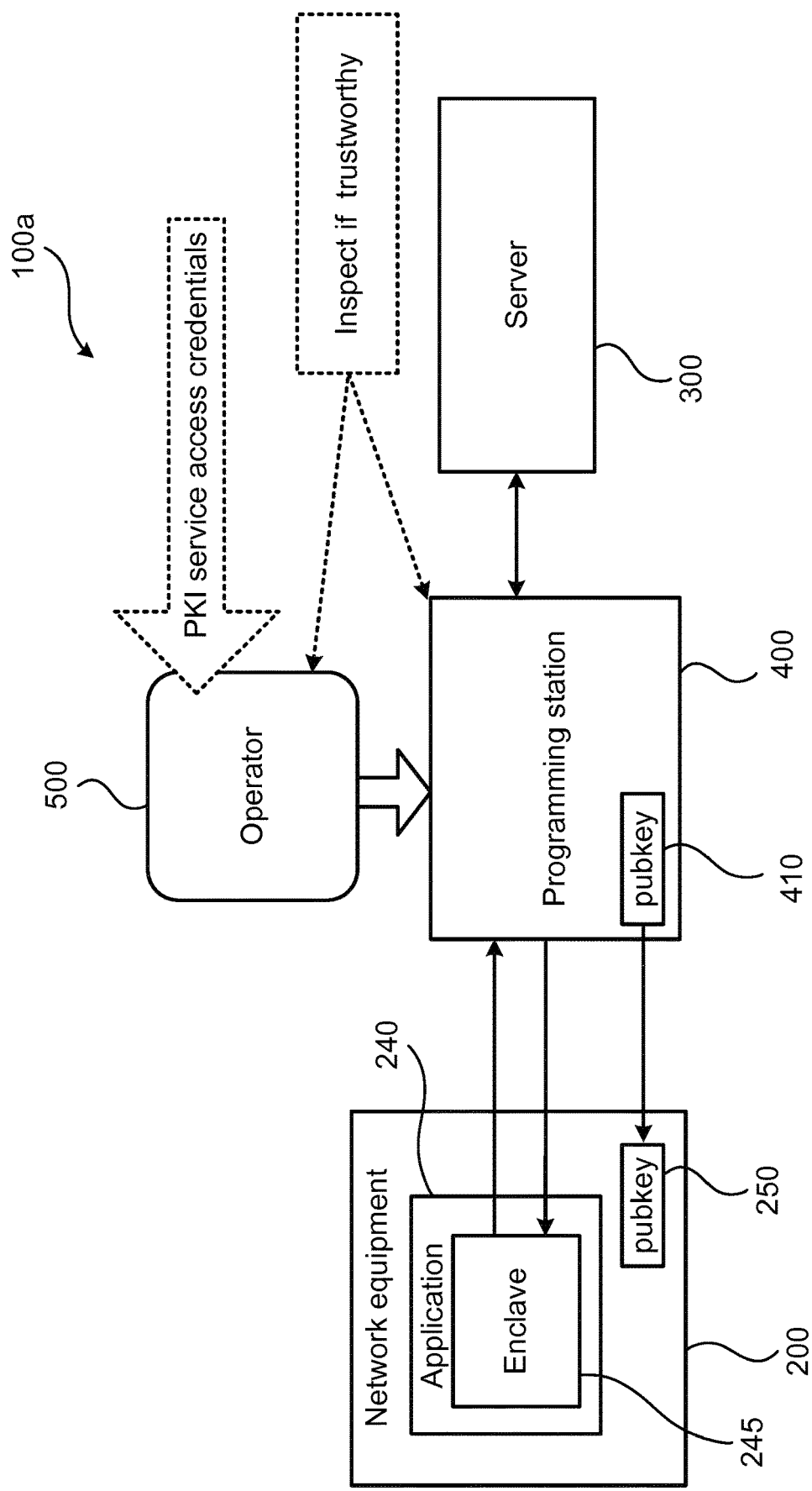
FIG. 1 is a schematic diagram illustrating provisioning of VC certificates to network equipment according to state of the art.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, there is need for an improved provision of VC certificates to network equipment.

In more detail, since the PKI service is commonly realized in a secure environment which safeguards the private (Certificate Authority; CA) key that is used to sign the certificates, the manufacturing site and the PKI service are not co-located but are separated and connected via a network by which the manufacturing site can request certificates. The precise interactions between the manufacturing site and the PKI service depend on several design choices, such as if the VC private key is locally generated in the programming station, in the hardware of the network equipment, or if it comes from the PKI service.

The communication between the manufacturing site and the PKI service is commonly protected using a secure communication protocol such as Transport Layer Security (TIS) or Internet Protocol Security (IPsec). In addition, there may be protection on the individual messages exchanged between the programming station and the PKI service. The latter is so if certificates are obtained using the Certificate Management Protocol version 2 (CMPv2) or similar secure certificate enrollment protocols.

The operator of the programming station is given access to the credentials by which the programming station can securely connect to the PKI service. Hence it is important that the procedures for appointing trustworthy operators must follow strict rules and before operators will be given the credentials, the procedures in place must be reviewed with the requirements (set by the PKI service operation). This requires on-site inspection of the manufacturing site and regular follow-up inspections that must assure that the procedures are maintained. Also, the programming station itself and the production environment at the manufacturing site must be inspected. The programming station must be secure enough to store the access credentials to the PKI service at least during its operation and possibly also at rest; in such a case the operator only has to remember an access credential that opens the main credential for PKI service access that he/she has to enter when working with the programming station.

The need for inspection before manufacturing can start as well as inspections during manufacturing (e.g. by randomly times inspection visits) causes that these security measures incur increased lead-time before a manufacturing site becomes operational. It also increases production costs.

The embodiments disclosed herein enable the efforts on, and cost for, the checking and maintenance of the programming station and operational procedures to be considerably lowered.

The embodiments disclosed herein particularly relate to mechanisms for obtaining a VC certificate from a server 300 and providing a VC certificate to network equipment 200. In order to obtain such mechanisms there is provided network equipment 200, a method performed by the network equipment 200, a computer program product comprising code, for example in the form of a computer program, that when run on processing circuitry of the network equipment 200, causes the network equipment 200 to perform the method. In order to obtain such mechanisms there is further provided a server 300, a method performed by the server 300, and a computer program product comprising code, for example in the form of a computer program, that when run on processing circuitry of the server 300, causes the server 300 to perform the method.

Figure 2:
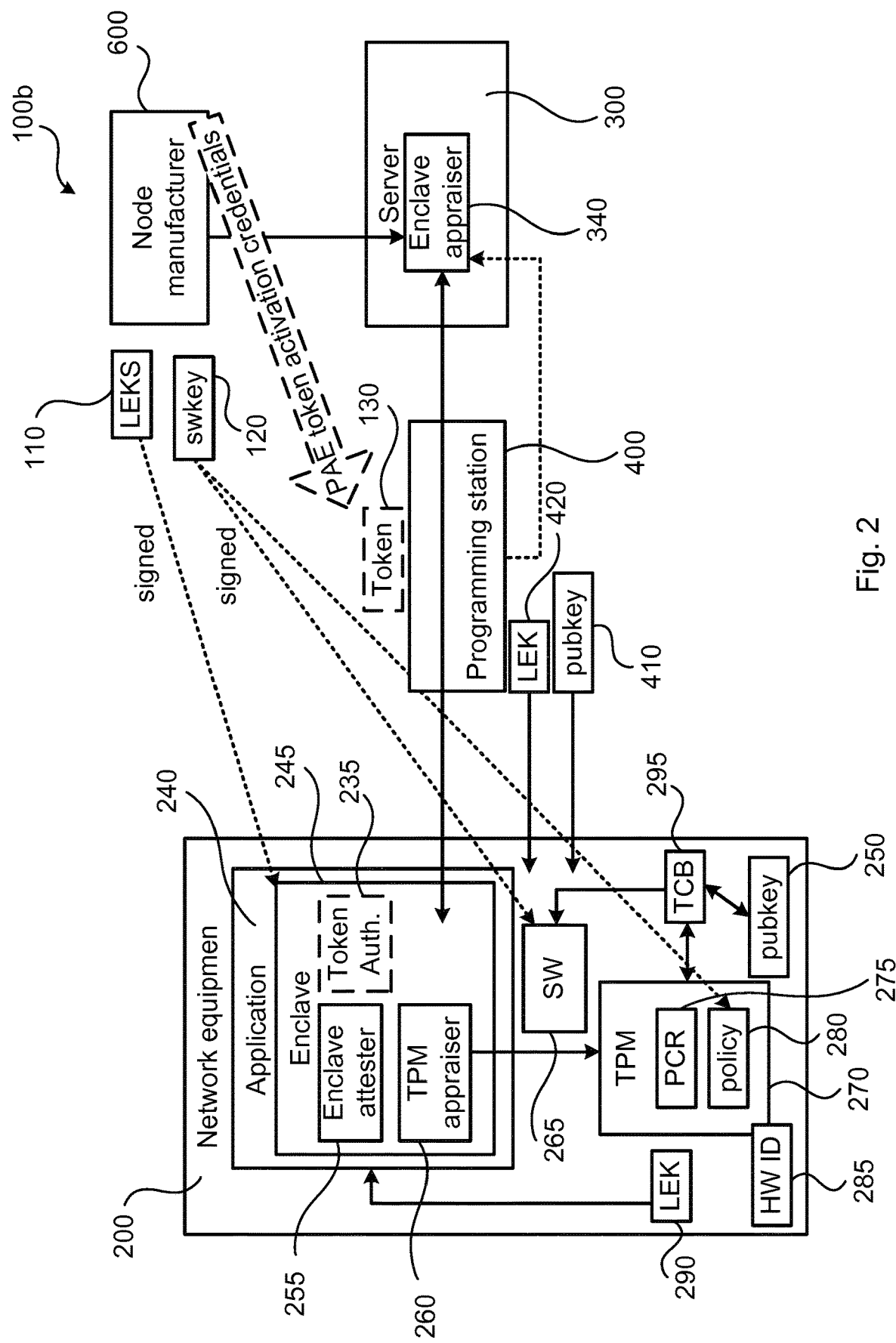
FIG. 2 is a schematic diagram illustrating provisioning of VC certificates to network equipment according to embodiments.

Reference is now made to FIG. 2 schematically illustrating a system 100b in which provisioning of VC certificates to network equipment 200 is performed according to embodiments disclosed herein.

Assume that the network equipment 200 is to receive a VC certificate from a server 300, the server 300 for example providing a PKI service. Assume further that the hardware of the network equipment 200 supports an enclave technology. Assume further that the hardware of the network equipment 200 supports a secure boot mechanism. The secure boot mechanism might use a software key (swkey) 120 to check, for example, the signature of software (SW) 265 that is booted or of the policy file that guides the secure boot decisions. The secure boot mechanism might be configured with a launch policy that is stored in the hardware. In general terms, the launch policy comprises instructions used for controlling the boot process in the sense that it instructs measured values of the booted software, as recorded by the hardware in the Platform Configuration Registers (PCRs) 275 of a Trusted Platform Module (TPM) 270, to be checked against reference values that have a signature in the policy data 280. The launch policy could be avoided if the boot behavior is fixed.

In general terms, a TPM might be defined as a hardware cryptographic module that is enabled to securely store sensitive data and perform various cryptographic operations. Authentication (a process to prove the identity attribute of an entity, i.e. the TPM acting as the integrity reporting entity) and attestation (a process that enables the software integrity state to be reported and verified in order to determine its trustworthiness) are some steps that might be performed to ensure trusted computing. A TPM can authenticate itself using the credentials stored in shielded memory and provide integrity measurements reports to prove that software is trustworthy. The nature of a TPM's shielded memory ensures that information may be stored and protected from external software attacks. A variety of applications storing data and secrets protected by a TPM can be developed. These applications make it much harder to access information on a computing platform without proper authorization. If the software configuration of a platform has changed as a result of unauthorized activities, access to such data and secrets can be denied. Various TPM specifications exist. TPMs can provide a hardware root of trust on a hosting service platform, and can be leveraged for operations such as measured boot and attestation.

A public key (pubkey) 250, 410 used for verification is handled by a trusted computing base (TCB) 295 and stored using integrity protection mechanisms. For example, a cryptographic hash of the public key might be burnt into the hardware. A suitable hash algorithm is SHA256, but other hash algorithms may be used. This public key may also be used to allow and verify the enclave but for the sake of generality the network equipment 200 might be configured with a launch enclave (public) key (LEK) 290, 420 that allows enclaves signed by the manufacturer of the network equipment 200 to be started.

A production application (PA) comprises a Production Application Enclave (PAE). This PAE is signed by the launch enclave's (secret) private key (LEKS) 110 which the node manufacturer 600 keeps secret from the manufacturing site and the server 300.

In addition, as will be further disclosed below, the PAE might comprise a whitelist of approved hardware chipset identifiers (such as an HW ID 285) or measured state so that the PAE only properly works on identified hardware and the hardware properly booted in one of the approved state(s). As will also be further disclosed below, such a whitelist might be provisioned at a later stage when the PAE has started, e.g., by letting the PAE pause until a signed whitelist has been provided.

In order to facilitate secure communication between the PAE and the server 300 the PAE is handed a connection credential by the server 300 after the server 300 has received attested information from the PAE about its launch measurements. These measurements may already depend on the measurements recorded in the TPM. Alternatively, appraisal of these measurements is performed after the appraisal of the enclave launch, as in the illustrative example of FIG. 2.

An optional enclave attester 255 is provided in the enclave for attesting the enclave in the network equipment

200. An optional enclave appraiser 340 is provided in the server 300 for performing appraisal of the enclave in the network equipment 200.

A TPM appraiser 260 is provided with the necessary information what measurements done by the TPM are acceptable. To increase efficiency, the PAE might comprise logics for acting as an appraiser towards the TPM in case the PAE not directly has (secure) access to the TPM but must interact with the TPM via the less trusted software in the public (i.e., non-enclave) part of the PA. In this manner, the TPM appraiser only has to compare the received measurements with the references provided. Alternatively, the server 300 might redirect the task of appraisal of the network equipment 200 to an appraiser service that is operated by the manufacturer of the network equipment 200. In such an alternative, the server 300 might receive a positive acknowledgement "OK" or a negative acknowledgement "NOT OK" back from the appraisal service. In either case, when the appraisal was successful, the server 300 might signal a connection credential that the PAE can use to setup a secure communications tunnel.

Optionally, the server 300 might pass a one time-password (OTP) to the network equipment 200. Such an OTP serves as authentication when sending the actual certificate sign request. The PAE can now generate the VC private and public key values and create a certificate sign request that it passes to the server 300.

In an alternative, as illustrated by dashed lines in FIG. 2, the PAE/PA interacts with a token 130 that is provided, for example, in the programming station or other terminal present at the manufacturing site. The token might be required to be manually activated by an operator using, for example, a password, or a biometric entry, such as a fingerprint. The token is authenticated by a token authenticator 235 in the enclave. Although this extra security requires management procedures with respect to personnel handling and possibly handling of tokens, it results in increased assurance that the PA/PAE is operating under authorized conditions.

As part of the appraisal it is possible to check the PAE operations against agreed working shift schedules. This will prevent personal at the manufacturing site to make the AP/PAE fully operational outside the agreed production schedule.

Figure 3:
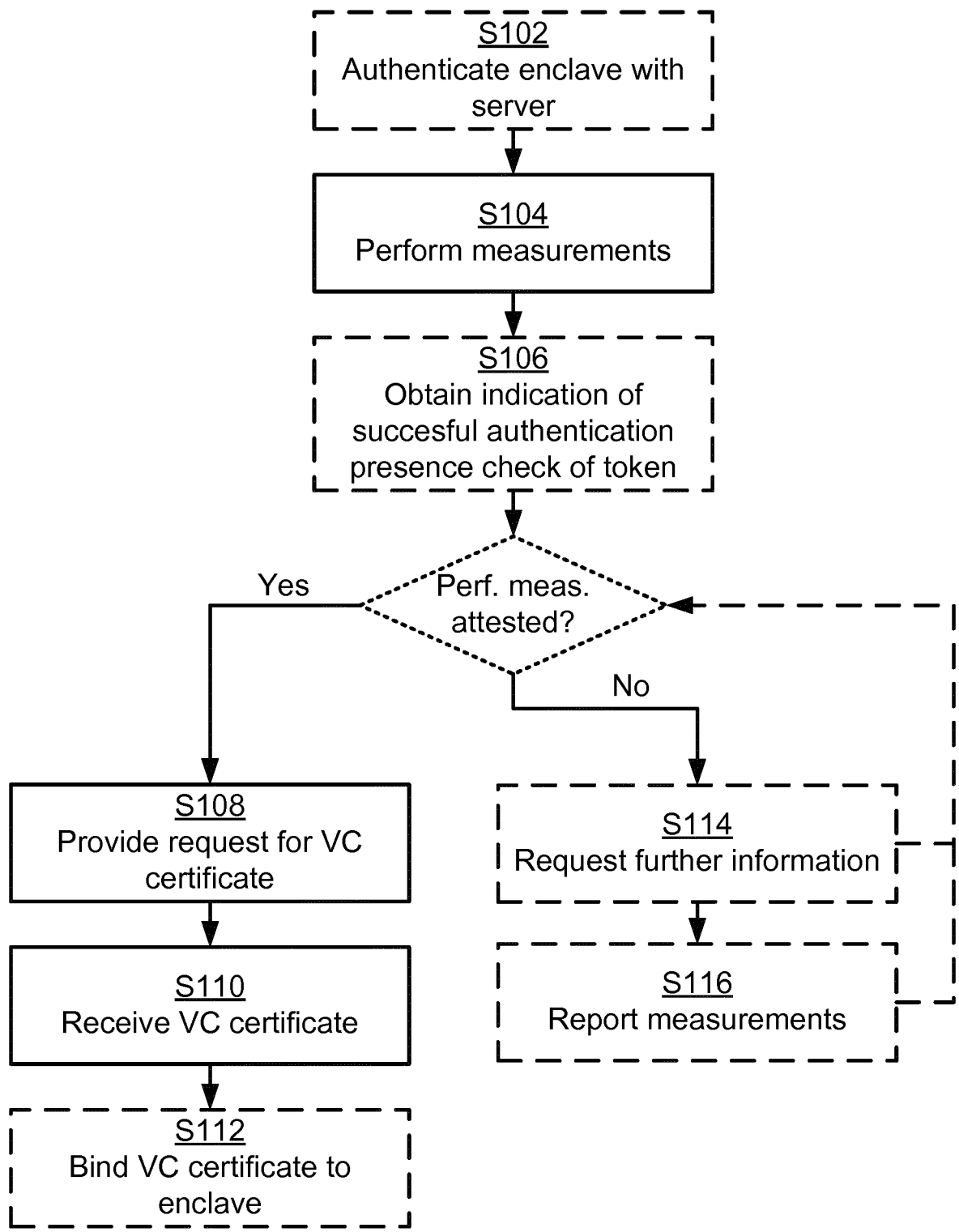
FIGS. 3 and 4 are flowcharts of methods according to embodiments.

Reference is now made to FIG. 3 illustrating a method for obtaining a VC certificate from a server 300 as performed by the network equipment 200 according to an embodiment.

Measurements are performed on the network equipment 200 before the VC certificate is requested. Thus the network equipment 200 is configured to perform step S104:

S104: The network equipment 200 performs, by means of an enclave of the network equipment 200, measurements on at least one property of the network equipment 200. The measurements might be performed on software and/or hardware of the network equipment 200, such as on hardware functions that are detected (or undetected) and/or enabled (or disabled), which software components have started (or not started, or stopped) execution.

Only once the measurements have been attested is the VC requested for. Thus the network equipment 200 is configured to perform step S108:

S108: The network equipment 200 provides, by means of the enclave, a request for the VC certificate from the server 300 upon having attested the measurements.

It is assumed that the server provides the VC certificate to the network equipment 200. Thus the network equipment 200 is configured to perform step S110:

S110: The network equipment 200 receives, from the server 300, the VC certificate in response to the request and stores the VC certificate in the network equipment 200.

Embodiments relating to further details of obtaining a VC certificate from a server 300 as performed by the network equipment 200 will now be disclosed.

In general terms, the term enclave as used herein could be regarded as short for hardware-mediated execution enclave. The enclave might generally be defined as an area of process space and memory within a system environment, such as network equipment 200, within a computer host which delivers confidentiality and integrity of instructions and data associated with that enclave. This enclave is protected from eavesdropping, replay and alteration attacks as the programs within the enclave are executed. An enclave is considered capable of executing processes, and executable code can be loaded into it. Various capabilities may be provided by such an enclave, but at minimum, the following might be enabled: the ability for executable software to be loaded into the enclave, the ability for the host to attest to the integrity of the executable code prior to execution, and the ability to load data into the enclave. The ability to execute software within the enclave without other processes on the computer host being able to inspect, alter or replay the instructions or associated data. Note that these protections are not just against unprivileged processes, but also against the TPM and hypervisor processes which may be running at an escalated privilege level.

There could be different examples of network equipment 200. Examples include, but are not limited to, radio access network nodes, core network nodes, as well as other network equipped nodes and devices that could benefit from being provided with a VC certificate.

There could be different ways to provide the enclave in the network equipment 200. In some aspects, the enclave is received from the server 300. That is, according to an embodiment the enclave is provided to the network equipment 200 from the server 300.

There could be different types of information provided in the request. In some aspects, the request comprises acceptable configuration information. According to an embodiment the request for the VC certificate comprises an indication of the attested measurements. This could help the server 300 to further attest the network equipment 200.

There could be different ways to provide the request to the server 300. In some aspects, the request is signed by the enclave. That is, according to an embodiment the request for the VC certificate is signed by the enclave. This could enable the request to be provided to the server 300 in a secure way, and enable the server 300 to verify that the request is from the enclave, and thus has not been tampered with.

There could be different ways for the network equipment 200 to handle the VC certificate once it has been obtained. In some aspects, the VC certificate is bound to the enclave, etc. before storage. Thus, according to an embodiment the network equipment 200 is configured to perform (optional) step S112 before storing the VC certificate:

S112: The network equipment 200 binds the VC certificate to the enclave and the measurements. This could enable the network node 200 to establish an association between the VC certificate, the enclave, and the measurements.

There could be different ways for the measurements to be attested. In some aspects, there is a whitelist, such as a boot appraiser whitelist, according to which the measurements are performed. Thus, according to an embodiment the measurements are performed on the at least one property according to a whitelist. In some aspects, the whitelist comprises boot measurement recordings. Hence, according to an embodiment the whitelist comprises boot measurement recordings to which the measurements are compared. In some aspects, the obtained measurements are compared to the whitelist with acceptable measurements. That is, according to an embodiment the measurements are compared to the boot measurement recordings by a boot appraiser in the enclave. In some aspects, the comparison is successful only when the measurements match the boot measurement recordings. That is, according to an embodiment the measurements only are attested when matching or being within a threshold value from the boot measurement recordings.

There could be different ways for the whitelist to be provided to the enclave. In some aspects, the whitelist is received from the server 300. That is, according to an embodiment the whitelist is provided to the enclave from the server 300. In some aspects, the whitelist is received using at least integrity protected (and, optional, encrypted) communications. Thus, according to an embodiment the whitelist is provided to the enclave using integrity protected communications between the enclave and the server 300. In other aspects the whitelist is provided to the enclave from an entity outside the server 300, or even hardcoded into the enclave.

When the whitelist is not received from the server 300, the server 300 could establish a trust with the provider of the whitelist. This could require the network equipment 200 to be authenticated by the server 300 before the measurements are performed. That is, according to an embodiment the network equipment 200 is configured to perform (optional) step S102 when the enclave is provided to the network equipment 200 from a provider outside the server 300:

S102: The network equipment 200 authenticates, by means of the enclave and with the server 300, before performing the measurements.

There could be different ways for the enclave in the network equipment 200 to act when the attest is not successful.

In some aspects the enclave requests further information from the server 300 when the attest is not successful. Thus, according to an embodiment the network equipment 200 is configured to perform (optional) step S114 when not being able to attest the measurements:

S114: The network equipment 200 requests, by means of the enclave, further information from the server 300 in order for the enclave to perform further measurements on the at least one property of the network equipment 200 or on at least one further property of the network equipment 200.

In some aspects the enclave reports the measurements to the server 300 when the attest is not successful. According to an embodiment the network equipment 200 is configured to perform (optional) step S116 when not being able to attest the measurements:

S116: The network equipment 200 reports, by means of the enclave, the measurements to the server 300.

As disclosed above, in some examples the provisioning of the VC certificate to the network equipment 200 is based on the use of a token. The enclave could then wait for an authenticated presence check of the token (as performed by the token authenticator). Particularly, according to an embodiment the network equipment 200 is configured to perform (optional) step S106:

S106: The network equipment 200 obtains an indication of a successful authenticated presence check of a token. The request for the VC certificate from the server 300 is then only provided upon having obtained the indication.

There could be different ways to provide the token. In some aspects the token is provided in a programming station. That is, according to an embodiment the token is provided in a programming station of the network equipment 200.

There could be different examples of the at least one property. One example of such at least one property is configuration parameters. That is, according to an embodiment the at least one property relates to configuration parameters of the network equipment 200. The configuration parameters might relate to software and/or hardware of the network equipment 200. The configuration parameters might be recorded in security protected registers (PCRs) of the network equipment 200. This recording may comprise storing the parameters values or cumulatively recording the hashes of the parameters. In the latter case the actual parameters may be stored in log files and the PCR values can be used to verify the integrity of the log files.

One particular embodiment for obtaining a VC certificate from a server 300 as performed by the network equipment 200 based on at least some of the above disclosed embodiments will now be disclosed in detail.

According to this embodiment the network equipment 200 uses signed software and a trusted boot process that performs measurements on the software and the hardware of the network equipment 200 to be started and which is capable to run enclaves delivered from the manufacturer of the network equipment 200.

The network equipment 200 performs a secure boot process and reports its configuration parameters into protected registers.

The network equipment 200 can use one or several public swkeys during the secure boot process to verify the software it boots. Each swkey is programmed into the network equipment 200 during the manufacturing process, at least prior to software programs being started.

The network equipment 200 contacts the server 300, possibly via an intermediator (such as a programming station).

The network equipment 200 receives an enclave from the server 300.

The enclave performs measurements on the software and hardware of the network equipment 200 and attests the measurements to the server 300. In order to do so the enclave first receives encrypted communication key material from the Server 300. The enclave then performs an interaction with the server 300 to compute a communications session key. The enclave and the server 300 switch to a secure communication using the communication session key. The enclave receives a whitelist of boot measurement recordings with acceptable measurements from the server 300. The enclave starts a boot appraiser which requests an attestation report of the measurements reported in the protected registers. The boot appraiser compares the obtained measurements to the boot measurement recordings of the whitelist. The enclave prepares a VC certificate (after having generated the VC credentials) request or a signed request for VC credential delivery when the measurements are in accordance with the boot measurement recordings of the whitelist. The enclave halts execution and waits for external input upon measurements not being in accordance with the boot measurement recordings of the whitelist.

The network equipment 200 receives the VC certificate or the VC credentials and the VC certificate from the server 300 and stores it securely in the network equipment 200 by binding it the VC credentials to the specific combination of enclave, hardware, and measurements.

Figure 4:
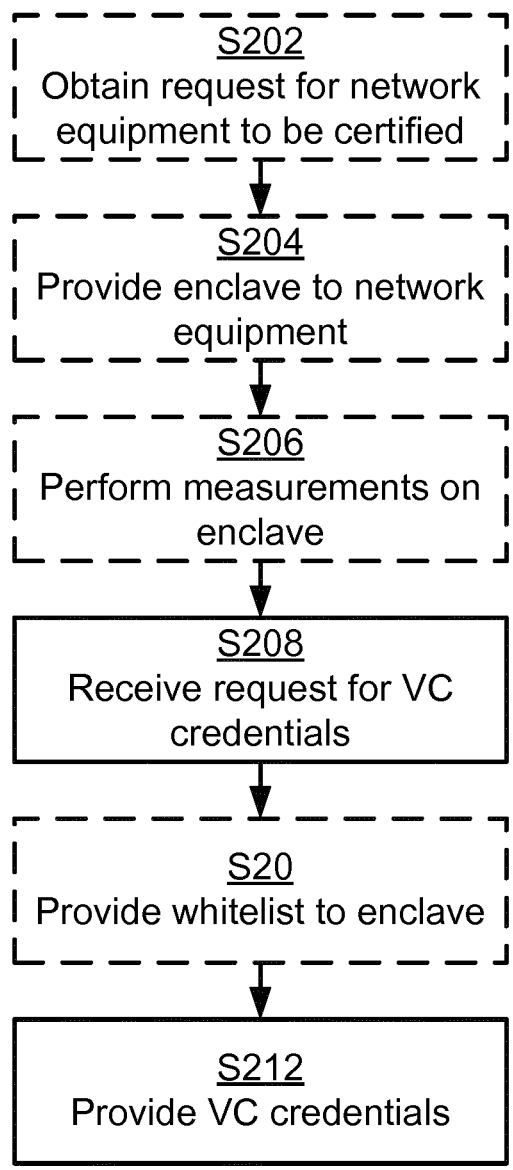

Reference is now made to FIG. 4 illustrating a method for providing a VC certificate to network equipment 200 as performed by the server 300 according to an embodiment.

As disclosed above, the network equipment 200, by means of the enclave, requests a VC certificate from the server 300. Thus, the server 300 is configured to perform step S208:

S208: The server 300 receives a request for the VC certificate from an enclave of the network equipment 200.

The server 300 then provides the VC certificate to the enclave. Thus the server 300 is configured to perform step S212:

S212: The server provides the VC certificate to the enclave.

Embodiments relating to further details of providing a VC certificate to network equipment 200 as performed by the server 300 will now be disclosed.

There could be different kinds of servers 300. In some aspects the server provides a PKI service, and might thus be regarded as a PKI server.

As disclosed above, in some aspects the request comprises acceptable configuration information. Thus, according to an embodiment the request for the VC certificate comprises an indication of measurements of the network equipment 200 as attested by the enclave.

In some aspects the VC certificate is only provided if configuration information is attested by the enclave. Thus, according to an embodiment the VC certificate only is provided to the enclave when the measurements of the network equipment 200 have been attested by the enclave.

As disclosed above, in some aspects the request is signed by the enclave. That is, according to an embodiment the request for the VC certificate is signed by the enclave.

In some aspects the network equipment 200 (e.g. via the programming station) requests to be certified. Thus, according to an embodiment the server 300 is configured to perform (optional) steps S202 and S204:

S202: The server 300 obtains a request from the network equipment 200 to be certified by the server 300.

S204: The server 300 provides the enclave to the network equipment 200 in response thereto (i.e., in response to having obtained the request in step S202).

In some aspects the server 300 performs appraisal of the enclave. Thus, according to an embodiment the server 300 is configured to perform (optional) step S206:

S206: The server 300 performs measurements on the enclave upon the enclave having been provided to the network equipment 200.

In some aspects there is a first whitelist that is used by the server 300 for appraising the enclave. Particularly, according to an embodiment the measurements are performed on the enclave according to a first whitelist.

In some aspects there is a second whitelist used by the enclave for appraising the network equipment 200. Particularly, according to an embodiment the server 300 is configured to perform (optional) step S210:

S210: The server 300 provides, in response to having received the request for the VC certificate from the enclave, a second whitelist to the enclave for the enclave to perform measurements on at least one property of the network equipment 200. The second whitelist comprises boot measurement recordings.

In some aspects the second whitelist is sent using encrypted communications. Particularly, according to an embodiment the second whitelist is provided to the enclave using integrity protected communications between the enclave and the server 300.

In some aspects the second whitelist is sent only when appraisal of the enclave is successful. That is, according to an embodiment the second whitelist only is provided to the enclave upon the server 300 having attested the measurements on the enclave.

In some aspects, before the VC certificate is provided to the enclave, the server 300 considers data received from the programming station, such as operation hours, hardware serial number, etc. of the network equipment 200. The server 300 might then use this information at the moment when the V certificate is to be provided to the network equipment 200.

One particular embodiment for providing a VC certificate to network equipment 200 as performed by the server 300 based on at least some of the above disclosed embodiments will now be disclosed in detail.

The server 300 is configured to issue VC certificates or VC credentials and VC certificates. The server 300 receives an application with an enclave from a manufacturer of the network equipment 200 and receives data comprising at least two whitelists; one whitelist (enclave whitelist) which the server 300 uses to perform an appraisal of the enclave instance running on the network equipment 200 and another whitelist (boot appraiser whitelist with boot measurement recordings) which the server 300 provides to the enclave when the enclave appraisal was successful.

The server 300 receives a request to start a VC certificate delivery to the network equipment 200. The request is received either from the network equipment 200 or from an intermediary, such as the programming station.

The server 300 sends the enclave to the network equipment 200 and starts an enclave appraisal.

Upon receiving the enclave attested information the server 300 compares this information with whitelist data received from the manufacturer of the network equipment 200.

Upon successful comparison, the server 300 generates communications key material and encrypts communications key material using the enclave public key. The server 300 sends the encrypted key material to the enclave. If the enclave appraisal is unsuccessful the server 300 instead sends an error indication.

The server 300 engages with the enclave in the communication session key agreement and switches to secure communications.

The server 300 sends boot appraiser whitelist received from the manufacturer of the network equipment 200 manufacturer to the enclave and waits for a response from the enclave.

The server 300 receives a certificate sign request, or a request for VC credentials and VC certificate, from the enclave.

If the request comprises acceptable configuration information of the network equipment 200 and is properly signed by the enclave instance, the server 300 generates a VC certificate (and also the needed VC credentials) and sends it to the enclave.

While the embodiments thus far have been described for use to provision VC certificates, the embodiments can be applied to similar settings where a product has to be given an identity, or platform certificate, during manufacturing.

Figure 5:
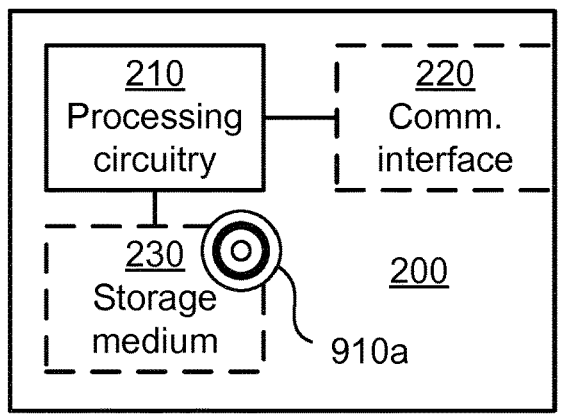
FIG. 5 is a schematic diagram showing functional units of network equipment according to an embodiment.

FIG. 5 schematically illustrates, in terms of a number of functional units, the components of network equipment 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network equipment 200 to perform a set of operations, or steps, S102-S116, as disclosed above. For example, the storage medium 230 may store the set of operations, and the processing circuitry 210 may be configured to retrieve the set of operations from the storage medium 230 to cause the network equipment 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network equipment 200 may further comprise a communications interface 220 for communications at least with the server 300. As such the communications interface 220 may comprise one or more transmitters and receivers, comprising analogue and digital components.

The processing circuitry 210 controls the general operation of the network equipment 200 e.g. by sending data and control signals to the communications interface 220 and the storage medium 230, by receiving data and reports from the communications interface 220, and by retrieving data and instructions from the storage medium 230. Other components, as well as the related functionality, of the network equipment 200 are omitted in order not to obscure the concepts presented herein.

Figure 6:
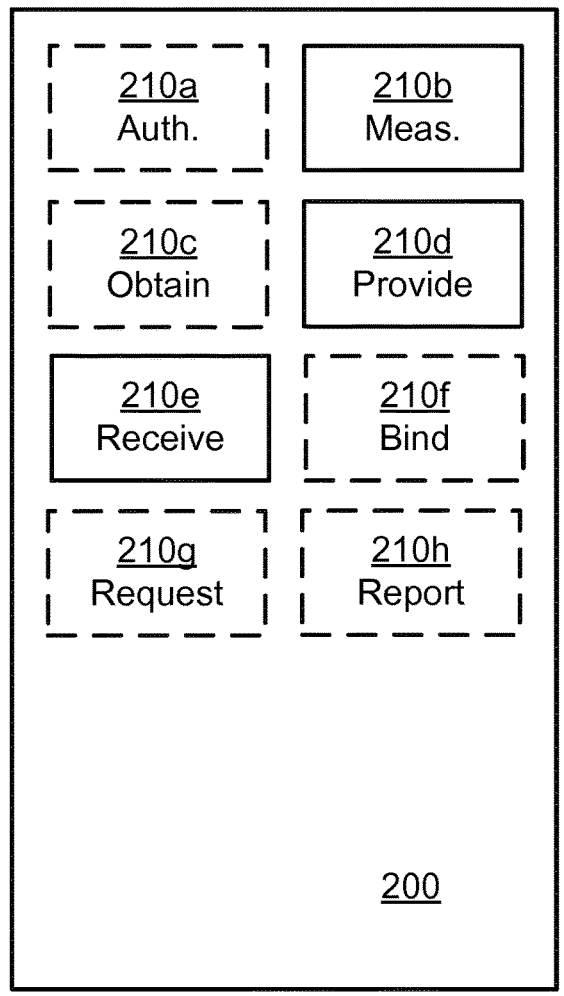
FIG. 6 is a schematic diagram showing functional modules of network equipment according to an embodiment.

FIG. 6 schematically illustrates, in terms of a number of functional modules, the components of network equipment 200 according to an embodiment. The network equipment 200 of FIG. 6 comprises a number of functional modules; a measurement module 210b configured to perform step S104, a provide module 210d configured to perform step S108, and a receive module 210e configured to perform step S110. The network equipment 200 of FIG. 6 may further comprise a number of optional functional modules, such as any of an authentication module 210a configured to perform step S102, an obtain module 210c configured to perform step S106, a bind module 210f configured to perform step S112, a request module 210g configured to perform step S114, and a report module 210h configured to perform step S116. In general terms, each functional module 210a-210h may be implemented in hardware or in software. Preferably, one or more or all functional modules 210a-210h may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210h and to execute these instructions, thereby performing any steps of the network equipment 200 as disclosed herein.

Figure 7:
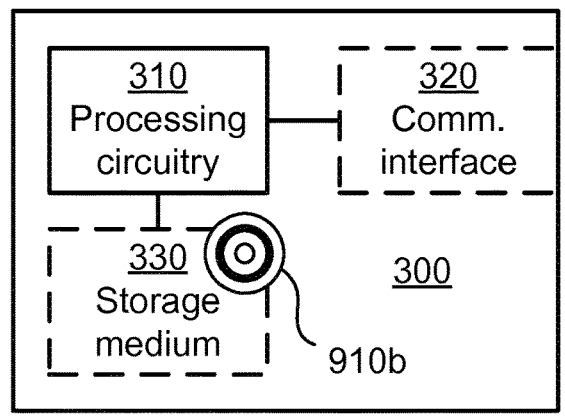
FIG. 7 is a schematic diagram showing functional units of a server according to an embodiment.

FIG. 7 schematically illustrates, in terms of a number of functional units, the components of a server 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the server 300 to perform a set of operations, or steps, S202-S212, as disclosed above. For example, the storage medium 330 may store the set of operations, and the processing circuitry 310 may be configured to retrieve the set of operations from the storage medium 330 to cause the server 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The server 300 may further comprise a communications interface 320 for communications at least with the network equipment 200. As such the communications interface 320 may comprise one or more transmitters and receivers, comprising analogue and digital components.

The processing circuitry 310 controls the general operation of the server 300 e.g. by sending data and control signals to the communications interface 320 and the storage medium 330, by receiving data and reports from the communications interface 320, and by retrieving data and instructions from the storage medium 330. Other components, as well as the related functionality, of the server 300 are omitted in order not to obscure the concepts presented herein.

Figure 8:
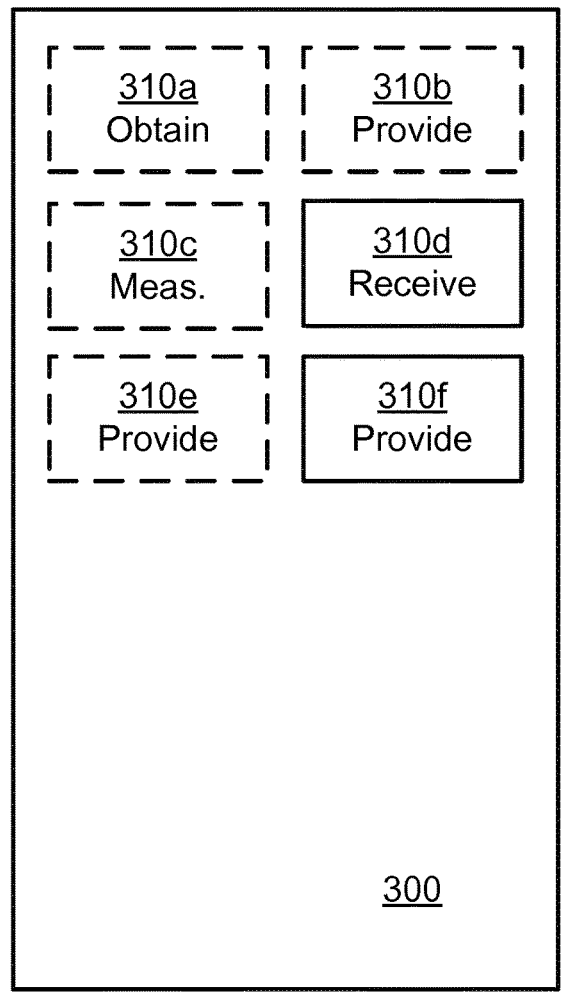
FIG. 8 is a schematic diagram showing functional modules of a server according to an embodiment.

FIG. 8 schematically illustrates, in terms of a number of functional modules, the components of a server 300 according to an embodiment. The server 300 of FIG. 8 comprises a number of functional modules; a receive module 310d configured to perform step S108, and a provide module 310f configured to perform step S112. The server 300 of FIG. 8 may further comprise a number of optional functional modules, such as any of an obtain module 310a configured to perform step S202, a provide module 310b configured to perform step S204, a measurement module 310c configured to perform step S206, and a provide module 310e configured to perform step S210. In general terms, each functional module 310a-310f may be implemented in hardware or in software. Preferably, one or more or all functional modules 310a-310f may be implemented by the processing circuitry 310, possibly in cooperation with the communications interface 320 and/or the storage medium 330o. The processing circuitry 310 may thus be arranged to from the storage medium 330 fetch instructions as provided by a functional module 310a-310f and to execute these instructions, thereby performing any steps of the server 300 as disclosed herein.

The network equipment 200 and/or server 300 may each be provided as a standalone device or as a part of at least one further device. For example, the network equipment 200 may be provided as part of a node of a radio access network or as part of a node of a core network, whereas the server 300 might be provided as part of a node in a service network. Alternatively, functionality of the network equipment 200 and/or server 300 may be distributed between at least two devices, or nodes.

Thus, a first portion of the instructions performed by the network equipment 200 and/or server 300 may be executed in a respective first device, and a second portion of the of the instructions performed by the network equipment 200 and/or server 300 may be executed in a respective second device; the herein disclosed embodiments are not limited to any particular number of devices on which the instructions performed by the network equipment 200 and/or server 300 may be executed. Hence, the methods according to the herein disclosed embodiments are suitable to be performed by network equipment 200 and/or server 300 residing in a cloud computational environment. Therefore, although a single processing circuitry 210, 310 is illustrated in FIGS. 5 and 7 the processing circuitry 210, 310 may be distributed among a plurality of devices, or nodes. The same applies to the functional modules 210a-210h, 310a-310f of FIGS. 6 and 8 and the computer programs 920a, 920b of FIG. 9 (see below).

Figure 9:
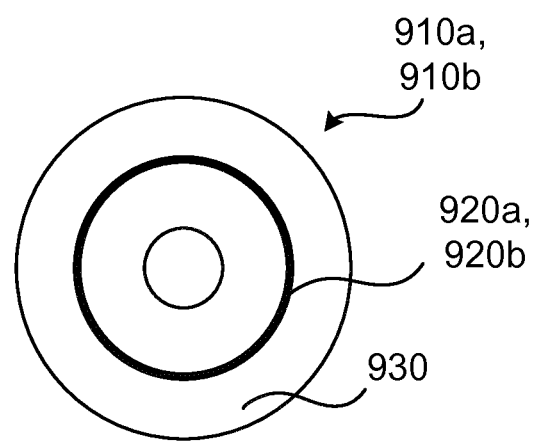
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the network equipment 200 as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the server 300 as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for obtaining a Vendor Credential (VC) certificate from a server, the method being performed by network equipment, the method comprising:
performing, by an enclave of the network equipment, measurements on at least one property of the network equipment, the at least one property relating to configuration parameters relating to hardware of the network equipment, the enclave being a process space and memory area within the network equipment and the enclave being arranged to execute software within the enclave without other processes being able to inspect, alter and replay associated data, the measurements being performed according to a whitelist, the whitelist comprising boot measurement recordings to which the measurements are compared;
providing, by the enclave, a request for the VC certificate from the server upon having attested the measurements, the request for the VC certificate comprising an indication of the attested measurements, the measurements only being attested while being within a threshold value from the boot measurement recordings; and
receiving, from the server, the VC certificate in response to the request and storing the VC certificate in the network equipment.

2. The method according to claim 1, wherein the request for the VC certificate is signed by the enclave.

3. The method according to claim 1, further comprising, before storing the VC certificate:
binding the VC certificate to the enclave and the measurements.

4. The method according to claim 1, wherein the measurements are compared to the boot measurement recordings by a boot appraiser in the enclave.

5. The method according to claim 1, wherein the whitelist is provided to the enclave from the server.

6. The method according to claim 5, wherein the whitelist is provided to the enclave using integrity protected communications between the enclave and the server.

7. The method according to claim 1, wherein the enclave is provided to the network equipment from the server.

8. The method according to claim 1, wherein when the enclave is provided to the network equipment from a provider outside the server, the method further comprising:
authenticating, by the enclave and with the server, before performing the measurements.

9. The method according to claim 1, wherein when not being able to attest the measurements, the method further comprising:
requesting, by the enclave, further information from the server in order for the enclave to perform further measurements on said at least one property of the network equipment or on at least one further property of the network equipment.

10. The method according to claim 1, wherein when not being able to attest the measurements, the method further comprising:
reporting, by the enclave, the measurements to the server.

11. The method according to claim 1, the method further comprising:
obtaining an indication of a successful authenticated presence check of a token, wherein the request for the VC certificate from the server only is provided upon having obtained the indication.

12. The method according to claim 11, wherein the token is provided in a programming station of the network equipment.

13. The method according to claim 1, wherein the configuration parameters are stored in security protected registers of the network equipment.

14. The method according to claim 1, wherein the configuration parameters further relate to software of the network equipment.

15. A method for providing a Vendor Credential (VC) certificate to network equipment, the method being performed by a server, the method comprising:
receiving a request for the VC certificate from an enclave of the network equipment, the enclave being a process space and memory area within the network equipment and the enclave being arranged to execute software within the enclave without other processes being able to inspect, alter and replay associated data and the request comprising an indication of measurements on at least one property of the network equipment attested by the enclave, the at least one property relating to configuration parameters relating to hardware of the network equipment, the measurements being performed according to a first whitelist, the whitelist comprising boot measurement recordings to which the measurements are compared, the measurements only being attested while being within a threshold value from the boot measurement recordings; and providing the VC certificate to the enclave.

16. The method according to claim 15, wherein the VC certificate only is provided to the enclave when the measurements of the network equipment have been attested by the enclave.

17. The method according to claim 15, wherein the request for the VC certificate is encryption signed by the enclave.

18. The method according to claim 15, further comprising:

obtaining a request from the network equipment to be certified by the server; and providing the enclave to the network equipment in response thereto.

19. The method according to claim 18, further comprising:

performing measurements on the enclave upon the enclave having been provided to the network equipment.

20. The method according to claim 19, further comprising:

providing, in response to having received the request for the VC certificate from the enclave, a second whitelist to the enclave for the enclave to perform measurements on at least one property of the network equipment, wherein the second whitelist comprises boot measurement recordings; and, wherein the second whitelist only is provided to the enclave upon the server having attested the measurements on the enclave.

21. The method according to claim 15, further comprising:

providing, in response to having received the request for the VC certificate from the enclave, a second whitelist to the enclave for the enclave to perform measurements on at least one property of the network equipment, wherein the second whitelist comprises boot measurement recordings.

22. The method according to claim 21, wherein the second whitelist is provided to the enclave using integrity protected communications between the enclave and the server.

23. A network equipment for obtaining a Vendor Credential (VC) certificate from a server, the network equipment comprising processing circuitry, the processing circuitry being configured to cause the network equipment to:

perform, by an enclave of the network equipment, measurements on at least one property of the network equipment, the at least one property relating to configuration parameters relating to hardware of the network equipment, the enclave being a process space and memory area within the network equipment and the enclave being arranged to execute software within the enclave without other processes being able to inspect, alter and replay associated data, the measurements being performed according to a whitelist, the whitelist comprising boot measurement recordings to which the measurements are compared;

provide, by the enclave, a request for the VC certificate from the server upon having attested the measurements, the request for the VC certificate comprising an indication of the measurements of the network equipment as attested by the enclave, the measurements only being attested while being within a threshold value from the boot measurement recordings; and receive, from the server, the VC certificate in response to the request and to store the VC certificate in the network equipment.

24. A network equipment for obtaining a Vendor Credential (VC) certificate from a server, the network equipment comprising:

processing circuitry; and a storage medium storing instructions that, when executed by the processing circuitry, cause the network equipment to:

perform, by an enclave of the network equipment, measurements on at least one property of the network equipment, the at least one property relating to configuration parameters relating to hardware of the network equipment, the enclave being a process space and memory area within the network equipment and the enclave being arranged to execute software within the enclave without other processes being able to inspect, alter and replay associated data, the measurements being performed according to a whitelist, the whitelist comprising boot measurement recordings to which the measurements are compared;

provide, by the enclave, a request for the VC certificate from the server upon having attested the measurements, the request for the VC certificate comprising an indication of the measurements of the network equipment as attested by the enclave, the measurements only being attested while being within a threshold value from the boot measurement recordings; and receive, from the server, the VC certificate in response to the request and to store the VC certificate in the network equipment.

25. A network equipment for obtaining a Vendor Credential (VC) certificate from a server, the network equipment comprising:

a measurement module configured to perform, by an enclave of the network equipment, measurements on at least one property of the network equipment, the at least one property relating to configuration parameters relating to hardware of the network equipment, the enclave being a process space and memory area within the network equipment and the enclave being arranged to execute software within the enclave without other processes being able to inspect, alter and replay associated data, the measurements being performed according to a whitelist, the whitelist comprising boot measurement recordings to which the measurements are compared;

a providing module configured to provide, by the enclave, a request for the VC certificate from the server upon having attested the measurements, the request for the VC certificate comprising an indication of the measurements of the network equipment as attested by the enclave, the measurements only being attested while being within a threshold value from the boot measurement recordings; and a receiving module configured to receive, from the server, the VC certificate in response to the request and to store the VC certificate in the network equipment.

26. A server for providing a Vendor Credential (VC) certificate to network equipment, the server comprising processing circuitry, the processing circuitry being configured to cause the server to:
receive a request for the VC certificate from an enclave of the network equipment, the enclave being a process space and memory area within the network equipment and the enclave being arranged to execute software within the enclave without other processes being able to inspect, alter and replay associated data and the request comprising an indication of measurements on at least one property of the network equipment attested by the enclave, the at least one property relating to configuration parameters relating to hardware of the network equipment, the measurements being performed according to a whitelist, the whitelist comprising boot measurement recordings to which the measurements are compared, the measurements only being attested while being within a threshold value from the boot measurement recordings; and
provide the VC certificate to the enclave.

27. A server for providing a Vendor Credential (VC) certificate to network equipment, the server comprising:
processing circuitry; and
a storage medium storing instructions that, when executed by the processing circuitry, cause the server to:
receive a request for the VC certificate from an enclave of the network equipment, the enclave being a process space and memory area within the network equipment and the enclave being arranged to execute software within the enclave without other processes being able to inspect, alter and replay associated data and the request comprising an indication of measurements on at least one property of the network equipment attested by the enclave, the at least one property relating to configuration parameters relating to hardware of the network equipment, the measurements being performed according to a whitelist, the whitelist comprising boot measurement recordings to which the measurements are compared, the measurements only being attested while being within a threshold value from the boot measurement recordings; and
provide the VC certificate to the enclave.

28. A server for providing a Vendor Credential (VC) certificate to network equipment, the server comprising:
a receiving module configured to receive a request for the VC certificate from an enclave of the network equipment, the enclave being a process space and memory area within the network equipment and the enclave being arranged to execute software within the enclave without other processes being able to inspect, alter and replay associated data and the request comprising an indication of measurements on at least one property of the network equipment attested by the enclave, the at least one property relating to configuration parameters relating to hardware of the network equipment, the measurements being performed according to a whitelist, the whitelist comprising boot measurement recordings to which the measurements are compared, the measurements only being attested while being within a threshold value from the boot measurement recordings; and
a providing module configured to provide the VC certificate to the enclave.

29. A non-transitory computer readable storage medium comprising a computer program for obtaining a VC certificate from a server, the computer program comprising computer code which, when run on processing circuitry of network equipment, causes the network equipment to:
perform, by an enclave of the network equipment, measurements on at least one property of the network equipment, the at least one property relating to configuration parameters relating to hardware of the network equipment, the enclave being a process space and memory area within the network equipment and the enclave being arranged to execute software within the enclave without other processes being able to inspect, alter and replay associated data, the measurements being performed according to a whitelist, the whitelist comprising boot measurement recordings to which the measurements are compared;
provide, by the enclave, a request for the VC certificate from the server upon having attested the measurements, the request for the VC certificate comprising an indication of the measurements of the network equipment as attested by the enclave, the measurements only being attested while being within a threshold value from the boot measurement recordings; and
receive, from the server, the VC certificate in response to the request and to store the VC certificate in the network equipment.

30. A non-transitory computer readable storage medium comprising a computer program for providing a VC certificate to network equipment, the computer program comprising computer code which, when run on processing circuitry of a server, causes the server to:
receive a request for the VC certificate from an enclave of the network equipment, the enclave being a process space and memory area within the network equipment and the enclave being arranged to execute software within the enclave without other processes being able to inspect, alter and replay associated data and the request comprising an indication of measurements on at least one property of the network equipment attested by the enclave, the at least one property relating to configuration parameters relating to hardware of the network equipment, the measurements being performed according to a whitelist, the whitelist comprising boot measurement recordings to which the measurements are compared, the measurements only being attested while being within a threshold value from the boot measurement recordings; and
provide the VC certificate to the enclave.

\* \* \* \* \*